June 28, 1966  P. J. WEAVER  3,258,026
VALVE
Filed Feb. 5, 1964
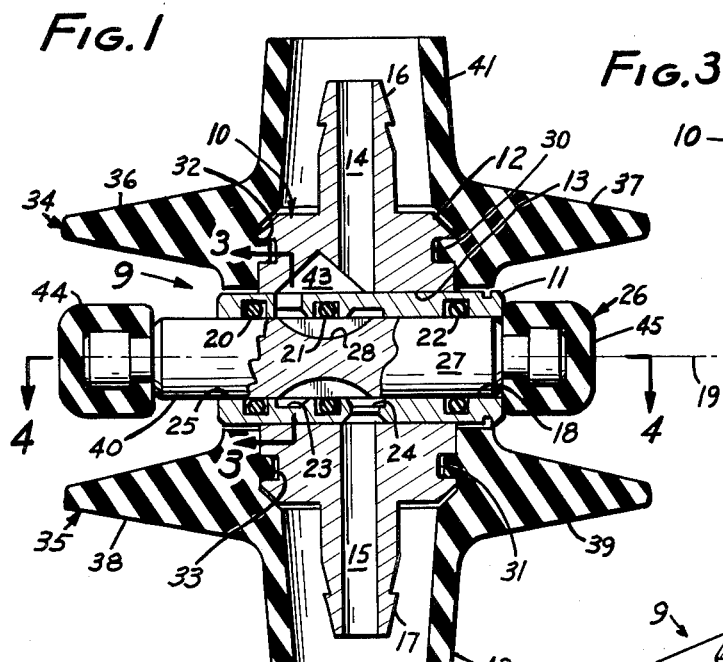
FIG. 1
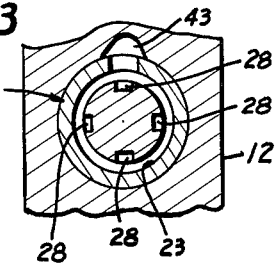
FIG. 3
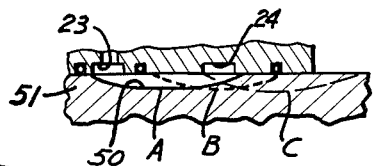
FIG. 4
FIG. 5
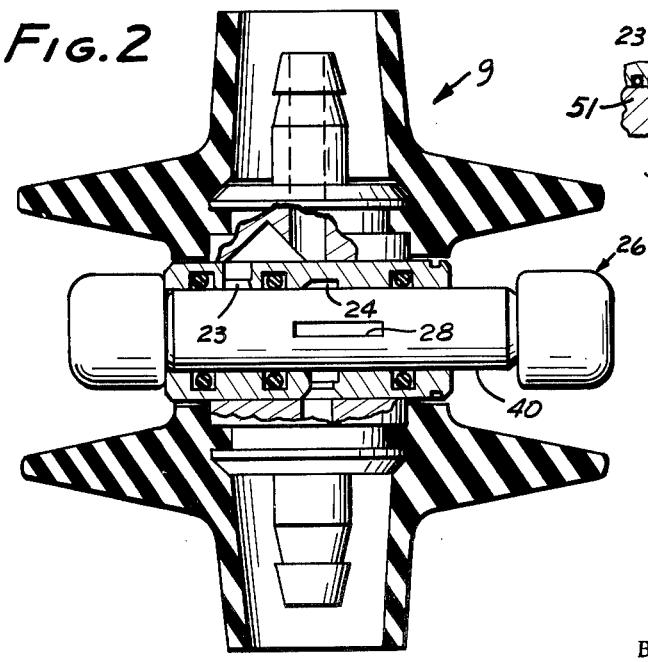
FIG. 2
INVENTOR.
PAUL J. WEAVER
BY *Angus & Mon*
ATTORNEYS.

United States Patent Office 3,258,026
Patented June 28, 1966

3,258,026
VALVE
Paul J. Weaver, Pasadena, Calif., assignor to Project Engineering Co., Inc., El Monte, Calif., a corporation of California
Filed Feb. 5, 1964, Ser. No. 342,658
16 Claims. (Cl. 137—375)

This invention relates to a flow control valve.

Particularly in the field of shielded welding, there is a requirement for a valve to control the flow of inert gas to regions surrounding the welding arc. It is desirable that the valve can be readily opened and closed, and also that it can be closed when shielded welding is not required.

Conventionally, the supply of inert gas is controlled by separate valves located somewhere near the gas source, which results in waste and which requires that the welding torch or welding head be put down while the gas is turned on or off.

It is an object of this invention to provide a valve which can be incorporated in the gas line, operated with one hand while the other hand still is free to hold the welding torch or welding head, and which can be dragged along, scuffing on the ground without damage to it and without changing the valve setting.

It is an additional object of this invention to provide such a valve which can be located quite near to the welding torch or welding head being thereby exposed to the radiant energy therefrom, still without being heated to such a degree that it is uncomfortable to handle or that its function is interfered with.

It is an additional object of this invention to provide such a valve which is able to be assembled from relatively inexpensive components.

A flow control valve according to this invention includes a body which has a spool passage with a first and a second opening extending through the body and opening into the said spool passage. The spool passage has an axis and the openings are axially spaced apart from each other. A spool in this passage is adapted to slide axially in fluid-sealing relationship with the wall thereof. The spool has a by-pass formed therein which is adapted to overlay and fluidly interconnect both openings in a first axial position of the spool and to overlay less than both openings in a second axial position of the spool, thereby to permit and prevent, respectively, flow between the openings.

According to a preferred feature of the invention, a shield surrounding the body on each side of the spool extends axially beyond the extremes of the motion of the ends of the spool whereby to prevent the spool from being axially moved when the valve is placed on a surface and where it at least partially shields the spool from incidence of radiant energy.

The above and other features of this invention will be fully understood from the following detailed description of the accompanying drawings in which:

FIG. 1 is a side elevation partly in cutaway cross-section, showing the presently preferred embodiment of the invention;

FIG. 2 is a view subtantially identical to FIG. 1, showing the valve in another operating position;

FIG. 3 is a cross-section taken at line 3—3 of FIG. 1;

FIG. 4 is a cross-section taken at line 4—4 of FIG. 1; and

FIG. 5 is a fragmentary view, partly in cutaway cross-section, illustrating a portion of an alternate embodiment of the invention.

The presently preferred embodiment of fluid control valve 9 is shown in FIG. 1. This device includes a body 10. The body comprises a sleeve 11 and a body base 12.

Base 12 includes a cylindrical bore 13 into which the sleeve is fitted and preferably cemented so that the body is a unitary assembly of sleeve 11 and base 12.

The body includes a first and second opening 14, 15, respectively, which openings pass through nipples 16, 17. These nipples are parallel to each other and disposed on opposite sides of bore 13.

Sleeve 11 has a passage 18 therethrough extending along a central axis 19. Passage 18 is cylindrical and includes first, second and third O-ring grooves and O-rings 20, 21, 22, respectively. These are axially spaced apart along the passage.

Grooves 23, 24 extend peripherally around wall 25 of the passage, and are disposed between the first and second and between the second and third O-rings, respectively. They respectively communicate with the first and second openings, and are the means by which the openings open into passage 18.

Spool 26 includes a central spindle portion 27 which is generally cylindrical and which makes an axially slidable, fluid-sealing fit with wall 25. It includes in its periphery four by-passes 28, which may simply by saw-cuts as illustrated. The length of these by-passes is such that in the first spool position (shown in FIG. 1), they overlap and fluidly interconnect grooves 23 and 24, and in a second spool position (shown in FIG. 2), they overlap less than both of said openings, to wit only groove 24, the left-hand end of by-passes 28 then standing to the right of O-ring 21. It will thereby be seen that this constitutes a simple off-on valve, the flow condition of which is determined by the axial position of the spool in passage 18.

The body base includes a pair of grooves 30, 31 on opposite sides of the bore which are adapted to receive shoulders 32, 33 on shields 34, 35. Each shield has a pair of tongues 36, 37 and 38, 39, respectively, which tongues extend beyond the extremes of movement of the ends of the spool. These also angularly overlap the ends of the spool so that the tongues serve to shade or shield the exposed metal portion, such as portion 40, of the spool from radiant energy such as that from the arc of the welding torch. In addition, it serves as a guard to keep the end of the spool from striking the ground. Such a blow could change the setting of the valve, and the shields prevent it. By the shoulders' snapping into the grooves, the shields are held tightly to the body. These shields also have necks 41, 42, which surround and protect the ends of the hoses (not shown). The hoses are pushed over the nipples to make fluid connections.

Nipple 16 is offset from groove 23 by passage 43 so that the nipples can be parallel and in line with each other, thereby forming an in-line valve. It will be appreciated that these nipples need not be in line. Instead they could be side by side or placed at any other desired angular relationship. However, one advantage of this valve is that it can be placed directly in line in close proximity to the welding torch or head, thereby to be conveniently accessible to the operator.

Covers 44, 45 are placed over the ends of the spindle portion of the spool. The shields and covers are made of abrasion-resistant material and also of material which is insulated in nature. One suitable material is neoprene rubber, hardness about 60 Shore.

The covers perform the additional function of limiting the extent of axial motion of the spindle portion. As can be seen in FIG. 1, the cover has struck the right-hand end of the sleeve, and the spindle cannot move farther to the left.

This device is readily adapted for use as a three-way valve as well. Utilizing the same sleeve construction as shown in FIG. 1, it is only necessary appropriately to change the length of the by-passes. For example, in FIG. 5, by-pass 50 is shown formed in a spindle portion 51. In position A, the by-pass overlaps both of grooves 23 and 24, thereby providing for a straight-through flow between the openings. In position B, shown by a dotted line, the by-pass overlaps only groove 24, thereby shutting off the valve entirely. In position C, shown by dashed line, the by-pass overlaps groove 24 and also extends beyond the sleeve, thereby connecting opening 15 to atmosphere. Grooves 23 and 24 may of be course be relocated to suit the requirements of any particular valve application.

This invention thereby provides a conveniently manufactured device which is simple and reliable to use, and which is adapted for both two and three-way valves with ease.

This invention is not to be limited by the embodiments shown in the drawings and described in the description which are given by way of example and not of limitation, but only in accordance with the scope of the appended claims.

I claim:

1. A flow control valve comprising: a body having a spool passage at least partially defined by a wall, and a first and a second opening through the body and opening into said spool passage, said spool passage having an axis, the openings being axially spaced apart from each other; a spool in said passage adapted to slide axially in fluid-sealing relationship with the wall of the passage, said spool having a by-pass formed therein adapted to overlay and fluidly interconnect both openings in a first axial position of the spool, and to overlay less than both openings in a second axial position of the spool, thereby to permit and prevent, respectively, flow between the openings; and a shield surrounding the body on each side of the spool, said shields extending axially beyond the extremes of the motion of the ends of the spool, whereby to prevent the spool from being axially moved by contact with a surface when the valve is placed on that surface, and at least partially to shield the spool from radiant energy.

2. A flow control valve according to claim 1 in which a sealing ring surrounds the spool on each side of each opening.

3. A flow control valve according to claim 1 in which the by-pass is formed in the external surface of the spool, and in which a sealing ring surrounds the spool on each side of each opening, that sealing ring which lies between the openings serving to isolate the by-pass from the first opening when the spool is in the said second position.

4. A flow control valve according to claim 1 in which covers are placed over the spool at each end thereof further to shield the spool from radiant energy.

5. A flow control valve according to claim 4 in which the shields and covers are made of insulating material and the body and spool are made of metal.

6. A flow control valve according to claim 5 in which a sealing ring surrounds the spool on each side of each opening.

7. A flow control valve according to claim 5 in which the by-pass is formed in the external surface of the spool, and in which a sealing ring surrounds the spool on each side of each opening, that sealing ring which lies between the openings serving to isolate the by-pass from the first opening when the spool is in the said second position.

8. A flow control valve according to claim 1 in which the spool includes a third position in which the by-pass is connected to one of said openings and to the exterior of said body.

9. A flow control valve comprising: a body having a spool passage at least partially defined by a wall, a pair of nipples on said body, said body and nipples having a first and second opening passing therethrough and opening into said spool passage, said spool passage having an axis, the openings being axially spaced apart and parallel to each other; a spool in said passage adapted to slide axially in fluid-sealing relationship with the wall of the passage, said spool having a by-pass formed therein adapted to overlay and fluidly interconnect both openings in a first axial position of the spool, and to overlay less than both openings in a second axial position of the spool, thereby to permit and prevent, respectively, flow between the openings; and a shield surrounding the body and respective nipple on each side of the spool, shields extending axially beyond the extremes of the motion of the spool whereby to prevent the spool from being axially moved by contact with a surface when the valve is placed on that surface, and at least partially to shield the spool and nipples from radiant energy.

10. A flow control valve according to claim 9 in which a sealing ring surrounds the spool on each side of each opening.

11. A flow control valve according to claim 9 in which the by-pass is formed in the external surface of the spool, and in which a sealing ring surrounds the spool on each side of each opening, that sealing ring which lies between the openings isolating the by-pass from the first opening when the spool is in the said second position.

12. A flow control valve according to claim 9 in which covers are placed over the spool at each end thereof further to shield the spool from radiant energy.

13. A flow control valve according to claim 12 in which the shields and covers are made of insulating material and the body and spool of metal.

14. A flow control valve according to claim 13 in which a sealing ring surrounds the spool on each side of each opening.

15. A flow control valve according to claim 13 in which the by-pass is formed in the external surface of the spool, and in which a sealing ring surrounds the spool on each side of each opening, that sealing ring which lies between the openings isolating the by-pass from the first opening when the spool is in the said second position.

16. A flow control valve according to claim 9 in which the spool includes a third position in which the by-pass is connected to one of said openings and to the exterior of said body.

References Cited by the Examiner

UNITED STATES PATENTS

| | | | |
|---|---|---|---|
| 1,585,332 | 5/1926 | Eickman | 137—382 |
| 2,964,054 | 12/1960 | Weatherhead | 137—382 |
| 3,097,865 | 7/1963 | Zeeb et al. | 285—45 X |

M. CARY NELSON, *Primary Examiner.*

H. KLINKSIEK, *Assistant Examiner.*